(12) United States Patent
Ben-David (10) Patent No.: US 9,182,854 B2
(45) Date of Patent: Nov. 10, 2015

(54) SYSTEM AND METHOD FOR MULTI-TOUCH INTERACTIONS WITH A TOUCH SENSITIVE SCREEN

(75) Inventor: Amichai Ben-David, Caesarea (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 1092 days.

(21) Appl. No.: 12/831,810

(22) Filed: Jul. 7, 2010

(65) Prior Publication Data

US 2011/0007029 A1    Jan. 13, 2011

Related U.S. Application Data

(60) Provisional application No. 61/213,736, filed on Jul. 8, 2009.

(51) Int. Cl.
| | |
|---|---|
| *G06F 3/045* | (2006.01) |
| *G06F 3/044* | (2006.01) |
| *G06F 3/046* | (2006.01) |
| *G06F 3/0488* | (2013.01) |

(52) U.S. Cl.
CPC ............... *G06F 3/044* (2013.01); *G06F 3/046* (2013.01); *G06F 3/04883* (2013.01); *G06F 2203/04808* (2013.01)

(58) Field of Classification Search
CPC .......... G06F 2203/04808; G06F 3/044; G06F 3/046; G06F 3/04883
USPC ............ 345/156, 173–184; 178/18.01–18.09, 178/19.01–19.04, 20.01
See application file for complete search history.

(56) References Cited

U.S. PATENT DOCUMENTS

| | | | |
|---|---|---|---|
| 6,054,990 A | 4/2000 | Tran | |
| 6,690,156 B1 | 2/2004 | Weiner et al. | |
| 7,292,229 B2 | 11/2007 | Morag et al. | |
| 7,372,455 B2 | 5/2008 | Perski et al. | |
| 2002/0018051 A1 | 2/2002 | Singh | |
| 2003/0071858 A1 | 4/2003 | Morohoshi | |
| 2005/0052427 A1 | 3/2005 | Wu et al. | |
| 2006/0010400 A1* | 1/2006 | Dehlin et al. | 715/856 |
| 2006/0026521 A1* | 2/2006 | Hotelling et al. | 715/702 |
| 2006/0026536 A1* | 2/2006 | Hotelling et al. | 715/863 |
| 2007/0216644 A1* | 9/2007 | Nam et al. | 345/158 |
| 2007/0247435 A1* | 10/2007 | Benko et al. | 345/173 |

(Continued)

FOREIGN PATENT DOCUMENTS

| | | |
|---|---|---|
| EP | 0543566 | 5/1993 |
| WO | WO 2009/064379 | 5/2009 |
| WO | WO 2011/004373 | 1/2011 |

OTHER PUBLICATIONS

U.S. Appl. No. 12/357,427, filed Jan. 22, 2009, Wohlstadter, et al.
Search Report of Internaional Application No. PCT/IL10/00548 mailed on Oct. 25, 2010.

(Continued)

*Primary Examiner* — Kumar Patel
*Assistant Examiner* — Insa Sadio (57) ABSTRACT

Embodiments of the invention are directed to interacting with a touch sensitive display screen. A method may include detecting a plurality of interactions with a touch sensitive screen. A display area may be defined based on locations associated with the interactions. An action may be performed with relation to a defined display area. An action may be performed with relation to content presented in a defined display area.

29 Claims, 9 Drawing Sheets

(56) References Cited

U.S. PATENT DOCUMENTS

| | | | |
|---|---|---|---|
| 2008/0036743 | A1 | 2/2008 | Westerman et al. |
| 2008/0165140 | A1* | 7/2008 | Christie et al. ............... 345/173 |
| 2008/0168403 | A1 | 7/2008 | Westerman et al. |
| 2008/0297482 | A1 | 12/2008 | Weiss |
| 2009/0047925 | A1* | 2/2009 | Rahman .................... 455/404.2 |
| 2009/0138800 | A1 | 5/2009 | Anderson et al. |
| 2009/0143141 | A1 | 6/2009 | Wells et al. |
| 2009/0184939 | A1 | 7/2009 | Wohlstadter et al. |
| 2009/0284478 | A1 | 11/2009 | De la Torre Baltierra et al. |

OTHER PUBLICATIONS

International Preliminary Report on Patentability Dated Jan. 19, 2012 From the International Bureau of WIPO Re. Application No. PCT/IL2010/000548.

International Search Report and the Written Opinion Dated Oct. 25, 2010 From the International Searching Authority Re. Application No. PCT/IL2010/000548.

Supplementary European Search Report and the European Search Opinion Dated Jan. 2, 2014 From the European Patent Office Re. Application No. 10796810.9.

* cited by examiner

SYSTEM AND METHOD FOR MULTI-TOUCH INTERACTIONS WITH A TOUCH SENSITIVE SCREEN

RELATED APPLICATIONS

This application is a Continuation-in-Part (CIP) of U.S. Provisional Patent Application No. 61/213,736 filed on Jul. 8, 2009. The contents of the above applications are all incorporated by reference as if fully set forth herein in their entirety.

BACKGROUND

Systems and devices that allow a user to operate a computing device with a stylus and/or finger are known. Typically, a digitizer is integrated with, or coupled to a display screen to produce a system capable of detecting user input, e.g., stylus interaction and/or finger touch. A digitizer may detect interactions and report an associated location, e.g., a location or coordinates relevant to an associated display screen. Position detection of user interactions may be provided as input to a computing device and may be interpreted as one or more user commands. In addition, one or more gestures performed with finger touch and/or stylus interaction may be associated with specific user commands. In some embodiments, input to the digitizer sensor is based on electromagnetic transmission provided by the stylus touching the sensing surface and/or capacitive coupling provided by the finger touching the screen.

For example, U.S. Pat. No. 6,690,156 entitled "Physical Object Location Apparatus and Method and a Platform Using the Same" and U.S. Pat. No. 7,292,229 entitled "Transparent Digitizer" both of which are assigned to N-trig Ltd., the assignee of the present application, the contents of both of which are incorporated herein by reference, describe a positioning device capable of locating multiple physical objects positioned on a flat panel display (FPD), and a transparent digitizer sensor that can be incorporated into an electronic device, typically over an active display screen of the electronic device. The digitizer sensor typically includes a matrix of vertical and horizontal conductive lines to sense an electric signal. Typically, the matrix is formed from conductive lines patterned on one transparent foil or on two transparent foils that are superimposed on each other. Positioning the physical object at a specific location on the digitizer provokes a signal, thus a position of origin may be detected.

U.S. Pat. No. 7,372,455, entitled "Touch Detection for a Digitizer" assigned to N-Trig Ltd., the contents of which are incorporated herein by reference, describes a digitizing tablet system including a transparent digitizer sensor overlaid on an FPD. As described therein, a digitizing tablet system is capable of detecting position of both physical objects and fingertip touch, using the same conductive lines.

U.S. Patent Application Publication No. US2006/0026521 and U.S. Patent Application Publication No. US2006/0026536, entitled "Gestures for touch sensitive input devices" the contents of which are incorporated herein by reference, describe reading data from a multi-point sensing device such as a multi-point touch screen where the data pertains to touch input with respect to the multi-point sensing device, and identifying at least one multi-point gesture based on the data from the multi-point sensing device.

U.S. patent application Ser. No. 12/357,427, entitled "Graphical object manipulation with a touch sensitive screen" assigned to N-Trig Ltd., the contents of which are incorporated herein by reference, describes a method of graphical object manipulation using a touch sensitive screen. The method comprises detecting a presence of two user interactions within a defined boundary of a graphical object displayed on the touch sensitive screen, determining position of each of the two user interactions with respect to the graphical object, detecting displacement of at least one of the two user interactions, and manipulating the graphical object based on the displacement to maintain the same position of each of the two user interactions with respect to the graphical object.

SUMMARY OF EMBODIMENTS OF THE INVENTION

Embodiments of the invention may enable interacting with a touch sensitive screen or display. According to embodiments of the invention, a method of interacting with a touch sensitive screen may comprise detecting a number of interactions of a user related to a touch sensitive screen or display. For example, at least three interactions of a user related to at least three respective locations on a screen may be detected. Based on the detected interactions, a display area may be defined and/or selected. A number of actions or operations may be performed with relation to a defined and/or selected display area. Any data, parameters, events, context or other information related to a defined and/or selected display area may be provided to a controller or other applicable computing device. An action performed may be related to a display area, to content associated with a defined or selected display area, to a context, to a combination of the above and/or to any applicable event, information or aspect.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF DEMONSTRATIVE EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of devices" may include two or more devices.

Some embodiments of the invention are directed to a device, system and/or method of interacting with a multi-touch sensitive screen or device. An exemplary method may comprise detecting at least three interactions of a user related to at least three respective locations on a screen, and optionally determining a gesture based on the at least three interactions. The exemplary method comprises defining a display area or region based on the locations and optionally on the recognized gesture, and performing an action related to data or other content associated with the defined display area or region. The area definition can be performed by a computing component associated with the multi-touch sensitive screen, in which case the definition may be based on the interaction locations or an identified gesture. Alternatively, the area definition can be performed by a component that is aware of the data displayed on the screen, such as an operating system or an application executed on an associated host computer. According to some embodiments of the present invention, a digitizer system as described herein may send, directly or indirectly, parameters or other information regarding detected location or movement of user interactions to a computing component such as a host computer. Based on location and/or movement of the interactions, an area of a display may be defined and content associated with such defined area may be identified. Content associated with an area defined as described herein may be provided to a controller or host computer and may be manipulated and/or acted upon. For example, graphical related manipulations or operations such as a resize, a zoom-in or a zoom-out, a cut, a copy, a displacement, a selection, a reflection about an axis, a rotation or resolution related operations may be applied, or suggested to be applied, to graphical or other content associated with an area defined as described herein. In some embodiments, e.g., if no unique operation that can be performed on the content is known or determined, a menu with the relevant operations may be presented. Any relevant information may be provided to a host or controller. For example, metadata related to the selected content, e.g., attributes such as name, size, orientation, location, permissions, modification time, or author related to a document being displayed or to a part thereof, or a sound track or subtitles data related to a multimedia object may some or all be provided to a host, controller or processor. Accordingly, actions performed on a selected display area may involve or be based on any relevant information, parameters or data that may be associated with the selected display area or region and/or with the content related to such display area.

Embodiments of the invention are not limited by the type of content associated with a display area defined as described herein. For example, in some embodiments, content associated with an area defined as described herein may be other than graphical. For example, such content may be textual or it may be multimedia content, e.g., a video clip. Accordingly, operations, processing or manipulations performed on or with relation to associated content may depend on the content. For example, in cases where the content is text, an operation may comprise cutting, copying, spell-checking of text, or modifying format, e.g., attributes of fonts such as font size, color, etc. In other cases, actions, processing and/or operations performed upon defining or selecting a display area may involve content or information other than that directly associated with the defined area. For example, a display area defined and/or selected as described herein may be related to a video clip. As described herein, a zoom-in operation may be performed with relation to such selected display area, accordingly, only the selected sub-area of the video clip may be selectively magnified, or only an enlarged version of the selected content shown on substantially the entire display. In such case, subtitles associated with the video clip may be manipulated, e.g., resized such that they fit into the defined, selected and shown display area which may typically be smaller than the original video display area. Accordingly, a user may select a sub-region from a display area of a video clip, zoom into such selected sub-region yet be still provided with relevant or related metadata or other information related to the clip.

In some embodiments, a display area or region may be defined and/or selected by an instantaneous interaction, a static interaction or an interaction that comprises movement. For example, a display area may be defined by the location of three or more user interactions and/or further by a movement of at least some of the interacting objects that may be the user's fingers, a stylus or any other applicable object. In further examples, the type of interaction can be considered, such as whether the touch was instantaneous, prolonged, tapping, double tapping, includes movement, or the like. According to embodiments of the invention, an action performed or suggested may relate to the selected or defined area, to the content associated with the selected or defined area or both. In some embodiments, an action performed may additionally or alternatively be related to configuration parameters, metadata related to associated content, context or any other applicable information, parameters or data. As referred to herein, user interactions or gestures may be any interactions with, or data transfer to a computing device and/or any associated peripherals. In particular, user interactions or gestures may comprise interactions with a touch screen, e.g., touching a touch screen at a number of locations, hovering or near touching a touch screen or moving one or more fingers or other objects over a touch screen. In some embodiments, a display area may be defined and/or selected by interacting, e.g., touching or tapping one or more locations on a touch screen. The interactions may be detected by embodiments of the invention and an enclosure such as a polygon (triangle, rectangle, etc.), or substantially closed curve (circle, ellipse, etc.) may be defined such that the three or more locations define (e.g., coincide with) features of the enclosure, e.g., corners of the polygon or circle circumference. For example, by touching three locations on a touch screen, a triangle may be defined where the locations of such triangle's corners are defined by the three touched locations. An area covered or defined by such triangle may be selected for processing and an action performed may be related to such area or to content such area or to content associated with such area, e.g., content displayed in such area. In another example, three points may define a circle inscribed in or circumscribing the triangle formed thereby.

Figure 1:
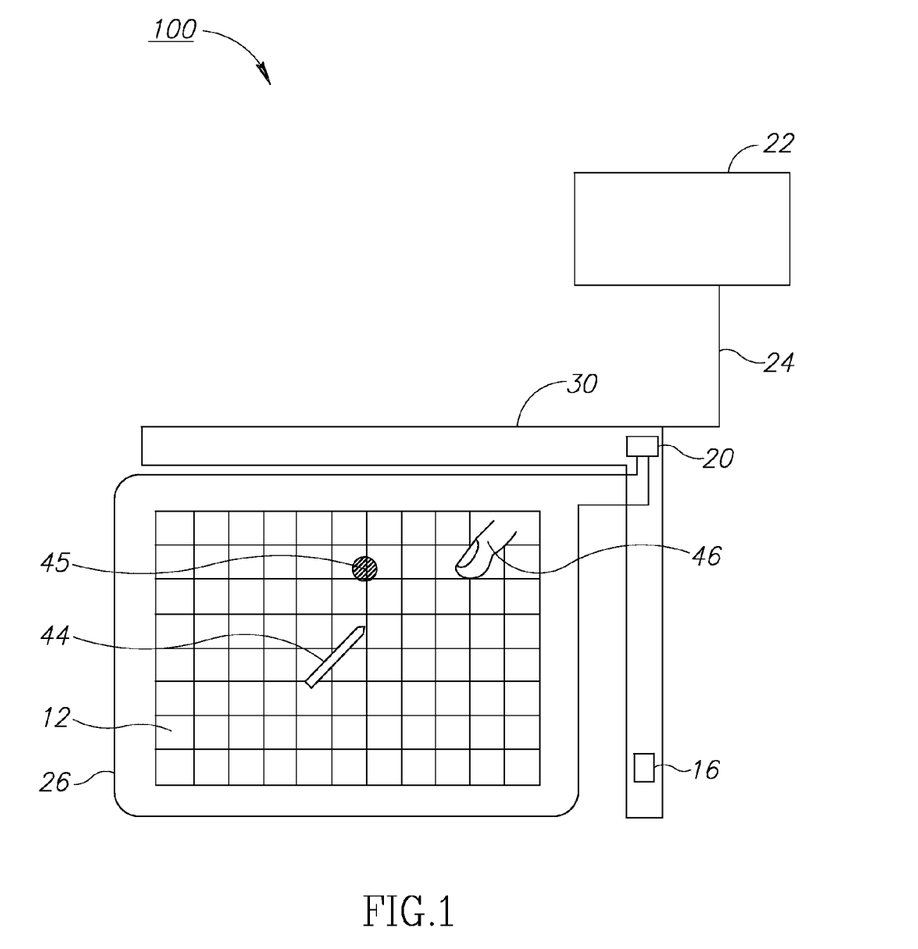
FIG. 1 is an exemplary simplified block diagram of a digitizer system in accordance with some embodiments of the present invention.

Reference is now made to FIG. 1, which shows an exemplary and simplified schematic diagram of a digitizer system 100 in accordance with some embodiments of the present invention. As shown, system 100 may comprise a printed circuit board (PCB) 30, a sensor grid 12, an application specific integrated circuit (ASIC) 16, a digital unit 20, an interface 24, an excitation coil 26 and a host 22. Host 22 may be any applicable computing device or system, e.g., a computing device that includes, or is operatively connected to, an FPD. For example, digitizer system 100 may be operatively connected to any one of a personal or portable computer (PC), a notebook, an eBook, a tablet PC, a pen enabled laptop or other computer, a tabletop computer, a personal digital assistant (PDA), a smartphone or a mobile or cellular phone. As shown, sensor grid 12 may comprise an arrangement of horizontal and vertical conductive lines. Sensor grid 12 may be transparent, and may typically be overlaid on an FPD as known in the art.

According to some embodiments of the invention, digital unit 20 may produce and control the timing and sending of a triggering pulse to be provided to an excitation to coil 26 that surrounds the sensor arrangement and the display screen. Excitation coil 26 may provide a trigger pulse in the form of an electric or electromagnetic field that may excite a passive circuitry, e.g. a passive circuitry, in stylus 44 or other object used for user touch, to produce a response from the stylus that can subsequently be detected. In some exemplary embodiments, a digitizer sensor may function as a capacitive sensor to detect the presence of fingertips, body parts and conductive objects, e.g. tokens.

According to some embodiments of the invention, any required circuitry and/or components may be provided on PCB 30 positioned around or near sensor grid 12. Output produced by sensor grid 12 may be provided to PCB 30 or components thereon, e.g., to ASIC 16 installed on PCB 30. ASIC 16 may comprise circuitry and components configured to sample and process output signals from sensor grid 12 and convert such signals into a digital representation. Digital output signals produced by ASIC 16 may be forwarded to a digital unit 20 for further digital signal processing. In some embodiments, digital unit 20 together with ASIC 16 may serve as a controller of digitizer system 100. Output from sensor grid 12, ASIC 16 and/or digital unit 20 may be provided (e.g., over interface 24) to host 22 for processing.

According to some embodiments of the present invention, sensor grid 12 may comprise a grid of conductive lines made of conductive materials, for example, Indium Tin Oxide (ITO) that may be patterned on a foil or glass substrate. The conductive lines and the foil may be transparent or they may be thin enough so that they do not substantially interfere with viewing an electronic display covered by or connected to sensor grid 12. Optionally, Sensor grid 12 may be made of one layer, patterned on both sides. In other embodiments, sensor grid 12 may made of two layers, which may be electrically insulated from each other. Typically, a first layer may contain a first set of equally spaced parallel conductive lines and a second layer may contain a second set of equally spaced parallel conductive lines orthogonal to the first set. Typically, the parallel conductive lines produce a signal used as input to amplifiers that may be included in ASIC 16. In some embodiments, the parallel conductive lines of sensor grid 12 may be spaced at a distance of approximately 2-8 mm, e.g., 4 mm, depending on the size of the relevant FPD and/or a desired resolution. Optionally the region between the grid lines is filled with a non-conducting material having optical characteristics similar to that of the (transparent) conductive lines, so as to mask the presence of the conductive lines. Typically, the ends of the lines remote from the amplifiers need not necessarily be connected, so that the lines do not form loops.

ASIC 16 may be connected to outputs of the conductive lines of grid sensor 12 and may process signals received therefrom. ASIC 16 may include an array of amplifiers to amplify received signals. According to some embodiments of the invention, digital unit 20 may receive sampled data from ASIC 16, processes received sampled data and determine and/or track a position of physical object on or near sensor grid 12 (e.g., the shown stylus 44, token 45 or a finger 46). According to some embodiments of the present invention, digital unit 20 may determine, based on signals received from ASIC 16, the presence and/or absence of physical objects (e.g., stylus 44, or finger 46) near or on sensor grid 12. Likewise, a movement of an object on or near sensor grid 12 may be determined, identified, monitored and/or tracked. In some exemplary embodiments of the present invention, a hovering or a near touching of an object, e.g. stylus 44 or finger 46, may be detected, e.g., by sensing capacitance changes in sensor grid 12 as known in the art. Accordingly, parameters and information related to a location and/or movement of an object on or near sensor grid 12 may be provided to a host computer, e.g., host 22 via interface 24.

According to some embodiments of the invention, host 22 may include at least a memory unit and a processing unit to store and process information obtained from digital unit 20. Memory and/or processing functionality may be distributed over any one of host 22, digital unit 20, and/or ASIC 16 as required. In a particular embodiment of the invention, an electronic display (not shown) may be placed near, associated with, or coupled to, system 100. For example, host 22 may cause data or other content to be displayed on an FPD or other display screen or device located close to sensor grid 12. Accordingly, content may be displayed or presented on a display screen coupled to sensor grid 12. Accordingly, an interaction with sensor grid 12 may be associated with content displayed or presented on an associated display. Any information, data or parameters related to any content presented on a display screen as described herein may be available to host 22. Accordingly, host 22 may coordinate, synchronize or otherwise relate or associate an interaction with grid sensor 12 and information presented on an associated display.

According to some embodiments, digital unit 20 may produce and manage a triggering pulse to at least one of the conductive line. In one preferred embodiment, interactions of one or more passive styli may be detected and/or acted upon. Optionally, any one or more of the styli may comprise a resonance circuit. Optionally, a stylus may comprise an energy pick up circuit and an oscillator. External peripheral coil 26 that surrounds the sensor may supply energy to the energy pick up circuitry comprised in the stylus. The exact position of the stylus may be determined by the detector, which may process the signals sensed by the sensor. Optionally, more than one stylus may be used.

Figure 2:
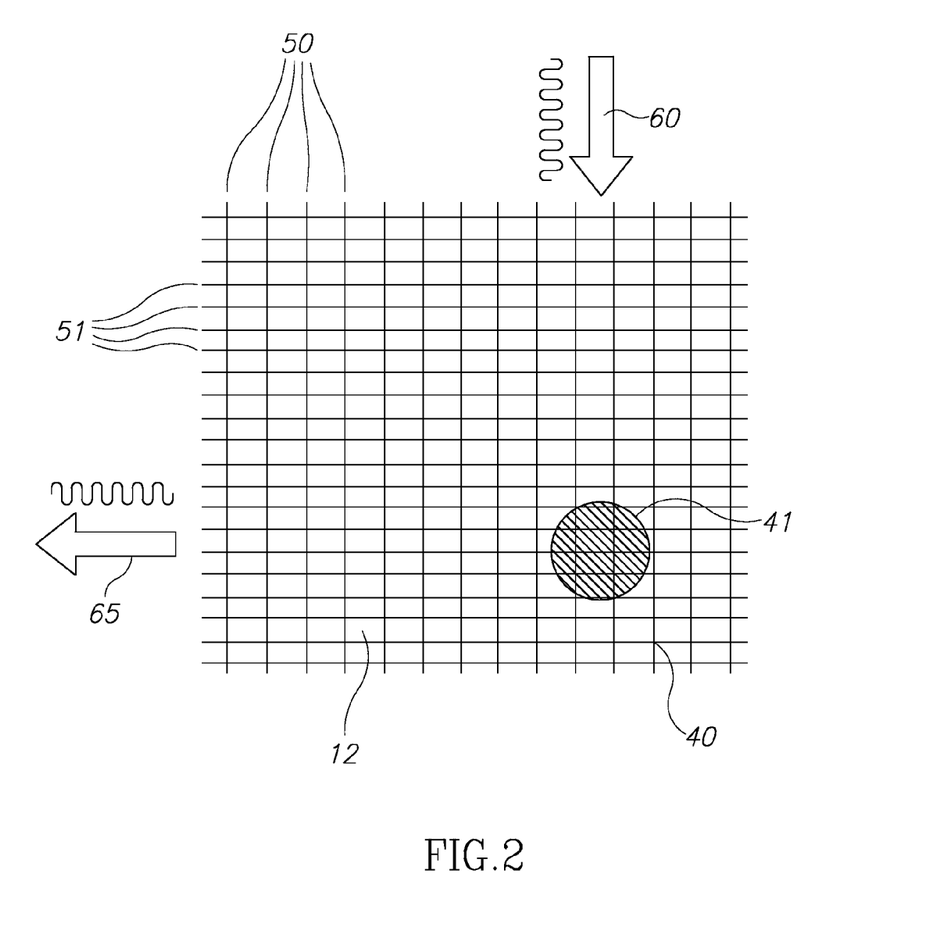
FIG. 2 is a schematic illustration of a multi-point touch detection method according to embodiments of the invention.

Reference is now made to FIG. 2, which shows a schematic illustration of capacitive touch detection. For example, digital unit 20 may produce and send an interrogation signal such as a triggering pulse to at least one of the conductive lines of sensor grid 12. In some cases, the interrogation pulse may be a modulated sinusoidal signal. At each junction, e.g. junction 40 in grid sensor 12, a certain capacitance may exist between orthogonal conductive lines of grid sensor 12.

For example and as shown, an alternating current (AC) signal 60 may be applied to one or more parallel conductive lines 50 in the two-dimensional matrix of lines of sensor grid 12. Such signal produces an induced signal 65 in the corresponding orthogonal lines 51. When a finger or other object touches or is brought near sensor grid 12 at a certain position, e.g., location 41 as shown, the capacitance between the conductive lines 50 through which signal 60 is applied and the corresponding orthogonal conductive lines 51, changes. As a result, the induced signal 65 may change, e.g., its amplitude may be lowered. For example, the presence of a finger may decrease the amplitude of signal 65 by fifteen to thirty percent (15-30%). Accordingly, both a touch and/or near touch may be detected by monitoring signal 65. Any number of objects touching or brought near grid sensor 12 may be simultaneously detected as described herein. Although in some embodiments detecting a touch, hover or near touch may be performed as described herein, other methods or systems may be used in other embodiments. Any other methods, e.g., as known in the art may be used to detect an interaction with a display screen, accordingly, it will be recognized that embodiments of the invention are not limited by the method, system or other aspects of detecting an interaction with a touch screen as referred to herein.

Figure 3A:
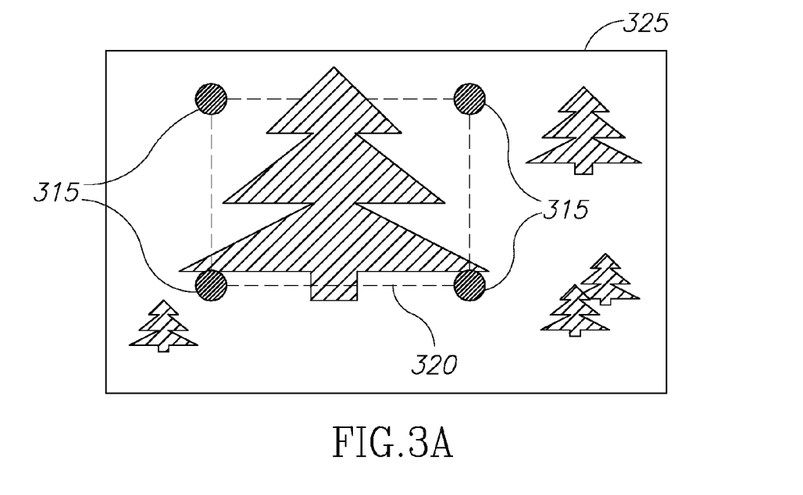
FIGS. 3A, 3B, 3C, 3D, 3E, and 3F show schematic illustrations of defining a display area according to embodiments of the invention.
Figure 3B:
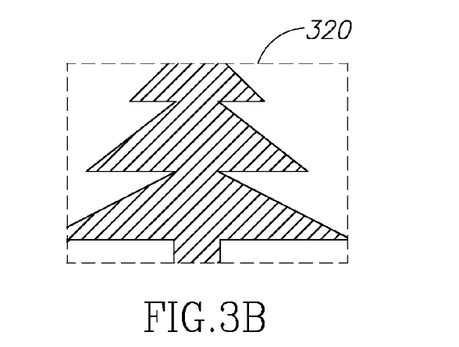
Figure 3C:
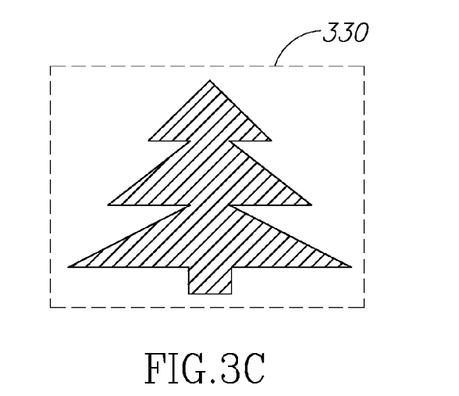

Reference is now made to FIGS. 3A, 3B and 3C, which illustrate detecting a plurality of interactions of a user with a display screen, and defining a display area based on the interactions according to embodiments of the invention. As shown by FIG. 3A, four locations 315 on display 325 where interactions of a user are detected may be identified or determined. As described further below, the interactions may be simultaneous (e.g., initiated substantially simultaneously), concurrent (e.g., being sensed as existing together at any moment), or otherwise sensed within a predefined period of time (e.g., being sensed within two seconds of the first interaction). For example, the locations may be identified or determined as described herein with respect to FIGS. 1 and 2. A polygon 320 (in this example, a rectangle) may be defined such that the polygon's corners' locations coincide with the locations of the interactions. Accordingly and as shown by FIG. 3B, a display area defined by polygon 320 may be identified or determined. Identifying polygon 320 does not require access to or knowledge of the displayed content and can therefore be performed by a processor associated with the touch screen. Alternatively, the content displayed on the display area in the relevant area may be identified and/or extracted by the underlying computing system, e.g., host 22, the operating system, or an application executed by host 22. In some embodiments, the content can also be identified and/or extracted using image processing techniques rather than application data that may be associated with the interaction locations. The coordinates defining polygon 320 (e.g., coordinates relative to display 325) and/or any other relevant information may be provided to a host or controller.

Although as described herein, three or more interactions may be used to define or select a display area, other configurations may exist. For example, two interactions may be detected and display defined based on the two interactions only. For example, a line connecting such two locations may be used to define a diagonal that may in turn be used to define related rectangle, e.g., a rectangle having sides parallel to the sides of the display, or a square having the two points as a diagonal. Likewise, two locations may be used to define a radius or diameter of a circle, and accordingly, a circle may be defined based on two locations. Any such shape defined by two or more locations may be used to define or select a display area, portion or region as described herein.

According to some embodiments, an area may be defined based on the presented content as well as three or more user interactions. For example, utilizing image processing techniques known in the art, or communicating with an application that sends data for presentation on the display device, objects displayed on display 325 may be identified. Specifically, an object (tree in this example) partially enclosed by polygon 320 may be identified and an entire area 330 of FIG. 3C surrounding the object may be selected. Accordingly, in addition to selecting an area based on user interactions and optionally a recognized gesture, a display area may further be defined such that it fully presents or includes an object presented or manipulated by an application or an operating system. Accordingly and as shown by FIG. 3C, by touching four locations 315, a user may select the tree generally surrounded by these locations. For example, a configuration parameter may dictate that if a predetermined portion of a graphical object, e.g., at least eighty percent (80%), is included in a display area as may be defined by three or more user interactions, then the actual display area defined or selected may be such that the entire graphical or other object is included therein. Such embodiments may enable easily selecting objects from within a picture or drawing by simply touching points around an object of interest. In an embodiment, the area may be contoured around the selected item.

Although selecting a display area by four locations defining a four sided polygon are shown in FIGS. 3A, 3B and 3C, other possibilities exists in other embodiments of the invention. For example, three, five or even more user interactions may be detected and a corresponding polygon having three, five or even more sides may be defined as described with respect to polygon 320. Accordingly, a display area corresponding to any number of user interactions' locations may be defined. Although not shown, more than one display area may be defined on display 325. According to embodiments of the invention, one or more display areas may be defined and selected on display 325 at the same time or at different times. For example, two or more polygons defined by corresponding user interactions may be defined simultaneously and their respective display areas may be provided to a controller. Any operations and manipulations related to a defined and/or selected display area as described herein may be applied or performed with relation to any number of defined and selected multiple display areas. For example, using both hands, a user may define two different display areas in display 325. Accordingly, the content of a plurality of areas or graphical objects may be manipulated simultaneously. For example, in a multi-touch screen, four fingers of a first hand may be used to define a first display area related to a first image displayed on the screen while four other fingers of a second hand may be used to define a second display area related to a second image. Such two display areas and associated content may be manipulated concurrently and/or independently from each other, e.g., based on user interactions and/or on the context relevant for each area, as described herein.

Although the display area selected from display 325 as shown by 320 is a rectangle, embodiments of the invention are not limited in this respect. Any applicable enclosure, e.g., polygon, closed curve, or other shape, may be defined. For example, using five fingers, a user may define a pentagon that may define a selected display area. Likewise, a triangle may be defined using three fingers or other objects. Other shapes, e.g., a circle or ellipse may be used to define and/or select a display area as further described herein. For example, a configuration parameter may define the shape of the defined and/or selected display area. For example, instead of defining a rectangle as shown by 320, a circle around locations 315 may be defined, and accordingly, a defined and selected display area related to interactions at locations 315 may be a circle, ellipse or any other shape determined by a configuration parameter.

According to some embodiments, a configuration parameter may define a period of time within which the interactions may be required to be associated with their respective locations. For example, a user may move her fingers over a display while contemplating the desired display area she would like to select. Although embodiments of the invention may detect such movement, a display area may not be defined until the user's fingers are stationary with respect to the relevant display for at least a predefined period of time, e.g., two seconds. Accordingly, when the user is satisfied with the area defined by the three or more fingers touching or hovering over the display, she may keep her fingers steady or stationary for two seconds thus actually selecting the area.

Figure 3D:
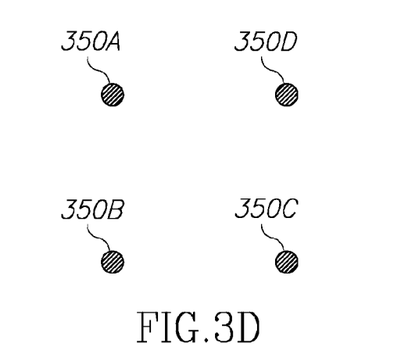
Figure 3E:
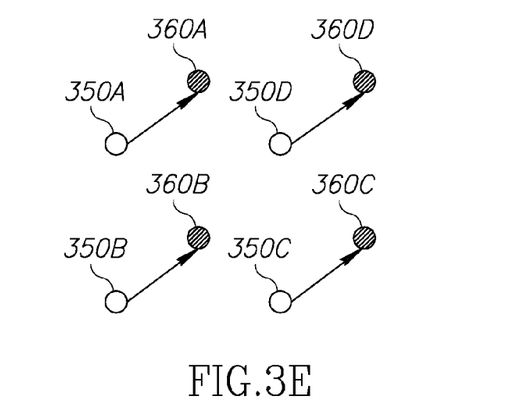
Figure 3F:
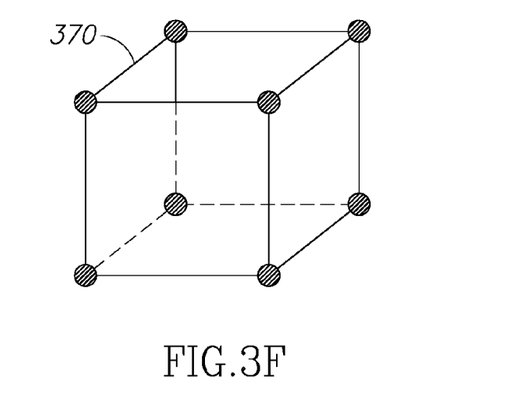

Although two dimensional content is mainly referred to herein, embodiments of the invention are not limited in this respect. As known in the art, three dimensional (3D) images or other content may be displayed on a display screen of a computing device. Accordingly, embodiments of the invention may be applicable to 3D content. Reference is now made to FIGS. 3D, 3E and 3F, which illustrate interactions related to 3D content. As illustrated by FIG. 3D, a user may interact with a touch sensitive display screen by touching four locations 350A, 350B, 350C and 350D. Such interactions may be detected by embodiments of the invention as described herein. For example, a user may provide an indication that locations 350A, 350B, 350C, and 350D comprise a first set of locations related to a 3D operation or selection. As illustrated by the arrows connecting locations 350A, 350B, 350C, and 350D to locations 360A, 360B, 360C, and 360D in FIG. 3E, the user may further move the four fingers from their original locations to four other respective locations. For example and as illustrated, the finger touching location 350A may be moved over the display screen to location 360A and similarly, other fingers may be moved from locations 350B, 350C, and 350D to respective locations 360B, 360C, and 360D. The user may then provide an indication, e.g., via a menu or by tapping the display, that locations 360A, 360B, 360C, and 360D comprise the second set of locations related to the 3D operation or selection. As shown by 370 in FIG. 3F, a 3D object related to the two sets of locations detected as described herein may be defined. For example and as shown, a volume defined by the eight locations 350A, 350B, 350C, and 350D and 360A, 360B, 360C, and 360D may be defined and selected. Various operations or actions as known in the art and as defined herein may be performed on such defined and selected 3D object, e.g., a rotation.

Defining and/or selecting a display area as described herein, e.g., with respect to FIGS. 3A, 3B, 3C, 3D, 3E, and 3F may enable defining and/or selecting similar or even identical display areas any number of times. For example, using a dedicated device or object, e.g., a hand held object designed to have three or more points of contact with a surface, a user may be able to select similar or even identical multiple 3D objects from a display screen. Similarly, such device or object may be used to define and/or select a plurality of identical display areas on a touch sensitive screen. According to one embodiment of the invention, the determination of whether the motion signifies moving "backward" into the background of the 3D image or moving "forward" into the foreground of the 3D image may be made based on the direction of movement, e.g., upper right signifies backward, and lower left signifies forward.

Figure 4A:
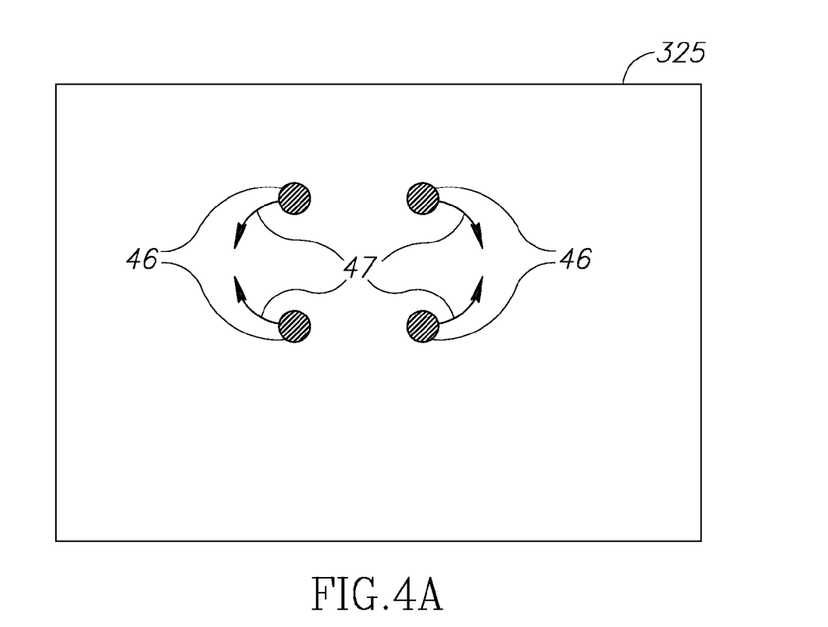
FIGS. 4A and 4B show methods of defining a display area according to embodiments of the invention.
Figure 4B:
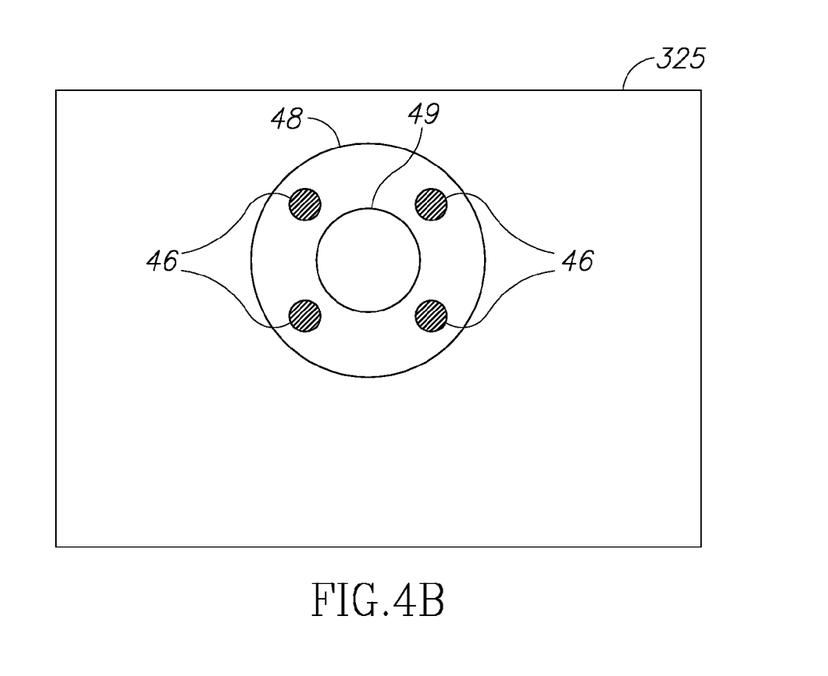

According to other embodiments of the invention, a display area may be defined and/or selected based on a movement related to an interaction. As described herein, a movement of one or more interactions may be detected. Reference is now made to FIGS. 4A and 4B, which show methods of defining a display area according to embodiments of the invention. As shown by locations 46 on display 325 in FIG. 4A, four user interactions at locations 46 may be detected. As further shown by arrows 47, a movement of the interactions may be detected. For example, using the index and thumb fingers of both hands, a user may touch locations 46 and further move the fingers as shown by arrows 47. Accordingly and as shown by circles 48 and 49 in FIG. 4B, a circle 48 or a circle 49 may be defined by the outer portions of locations 46 or the inner portions of locations 46 respectively, e.g., so as to include or exclude locations 46. Whether a circle such as 48 or 49 is defined may be based on a configuration parameter that may determine the size, location, data type, direction of motion or other relevant parameters related to a circle defined on display 325 based on a movement of interactions as shown by arrows 47.

Figure 5A:
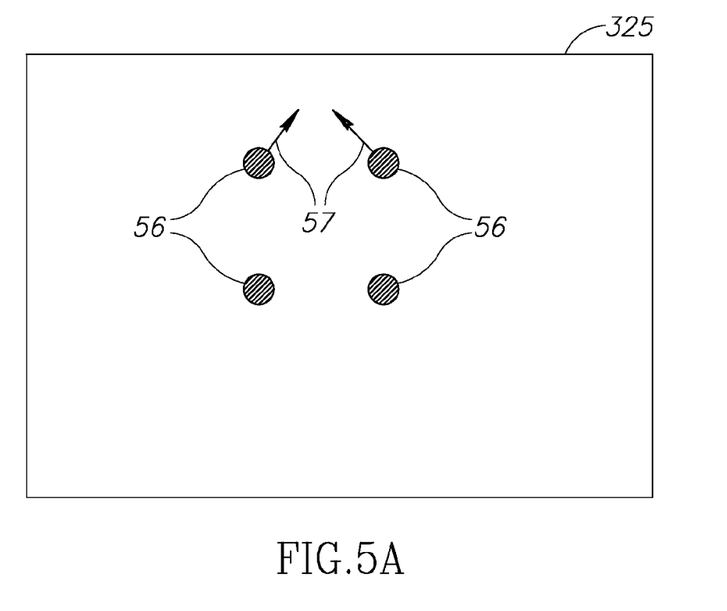
FIGS. 5A and 5B show methods of defining a display area according to embodiments of the invention.
Figure 5B:
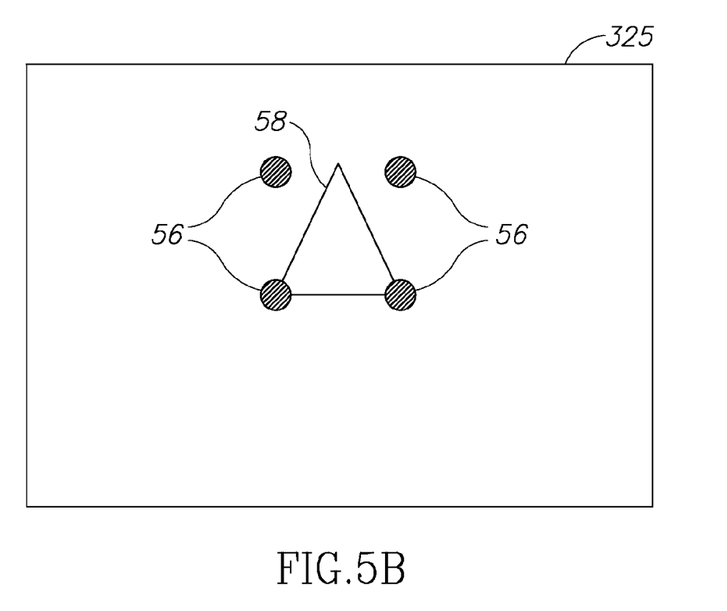

Reference is now made to FIGS. 5A and 5B, which show methods of defining a display area according to embodiments of the invention. As shown by FIG. 5A, four user interactions at locations 56 on display 325 may be detected. As further shown by arrows 57, a movement of the interactions may be detected. For example, using the index and thumb fingers of both hands, a user may touch locations 56 and further move the index fingers as shown by arrows 57. Accordingly and as shown by 58, a triangle may be defined based on such movement. As discussed with relation to circles 48 and 49, the size, orientation or any other relevant parameters related to triangle 58 and/or display 325 may be determined by one or more configuration parameters that may be set by a user or may be preconfigured.

Although as described herein with reference to FIGS. 4A, 4B, 5A and 5B, a display area may be defined by detecting a location and/or movement of two or more interactions, embodiments of the invention are not limited in this regard. For example, in some embodiments, a display area may be defined by a number of, possibly stationary, user interactions and further detecting an additional user interaction that may be associated with a movement. For example, interactions fixed in place at four locations may be detected, and a polygon associated with such four locations may be defined upon detecting a fifth interaction that may be a tapping or a moving of a finger over a fifth location on a display. Likewise, after detecting three interactions at three locations, an associated triangle may be defined upon detecting a tapping at one or more of the three locations. By providing a controller with any relevant information, data or parameters related to detected interactions, any combination or sequence of interactions may be used to define and select a display area as described herein.

According to embodiments of the invention, various time constraints or parameters may be related to user interactions that may be used to define a display area as described herein. For example, in one embodiment, detected user interactions that may be used to define a display area or region may be required to occur or be detected substantially simultaneously or concurrently. For example, all four interactions at locations 315 in FIG. 3A may be required to be detected as initiated or otherwise existing at the same time in order for rectangle 320 to be defined and the associated display area defined and/or selected. Such configuration or constraint may prevent false definitions of display area that may result from a user touching a display screen without intending to actually define or select a display area.

Another time related parameter in another embodiment may define a time period during which all interactions that may define a display area may be detected. For example, all four interactions at locations 315 in FIG. 3A may be required to be detected and present during one second, two seconds, or three seconds, or another predefined interval, in order for rectangle 320 to be defined. Accordingly, a user may move his fingers over a display until satisfied with the display area defined by the fingers and then hold his fingers still for two seconds in order for the related display area to be selected. In some embodiments, the display area that will be selected based on the locations of the interactions may be shown to a user, e.g., by drawing dashed lines connecting the locations where interactions are detected.

Accordingly, a user may move his fingers on a display and see the display area that may be selected and, when satisfied with the display area as shown, keep his fingers still or stationary for a predefined period of time to actually cause a definition and/or selection of a display area. In yet other embodiments or configurations, a predefined time interval may be measured from the first to occur interaction. For example, upon detecting a first interaction that is stationary or associated with a location for a first predefined period of time, a timer may be set to expire after a second predefined period of time. Within such second predefined period of time, other interactions may be required to be detected and possibly remain stationary in order for a display area to be defined in association with such other interactions and the first interaction. Such embodiment may enable a user to first determine a first location on a display screen and subsequently select other points or locations that will be used to define a display area, region or portion.

According to embodiments of the invention, any processing, manipulation, modification, transformation or other related actions may be performed with respect to a defined and/or selected display area, region or portion. For example, an action may be or may comprise providing any parameters related to a defined or selected area and/or associated content. An action may be or may comprise providing some or all of the content included in, or otherwise related to, a defined or selected area to a processor or controller. For example, graphical content in a selected display area may be provided to a host that may perform any processing, presentation or other manipulations of such provided content. In some cases, textual data or information may be provided to a controller, e.g., in cases where the content in the selected display area is text. Such host may further be provided with any additional information, metadata, data or parameters. For example, a host may be provided with the size or area of the selected display region, the coordinates of the user interactions used for defining a display area etc.

As further described herein, an action performed with relation to a selected display area may be automatically performed or invoked, e.g., upon performing a selection or definition of a display area as described herein, one or more actions may be automatically performed. In other cases, configurations or embodiments, an action may be performed based on user input that may be an interaction or gesture similar to user interactions described herein, e.g., similar to interactions used for selecting or defining a display area as described herein. For example, four finger tapping that creates a rectangle comprising at least a predetermined percent of an object may initiate zoom-in of the object; double tapping on the same locations may enable editing of the object; a prolonged touch at the same locations initiates another action, or the like. Thus, the selected area as well as the action to be initiated upon it, may be determined upon the interaction locations and the type of interaction.

According to embodiments of the invention, an action performed may be related to the display area itself, e.g., its size, orientation, location etc., to content included or otherwise related to a defined or selected display area, to metadata related to either the selected display area or the content or to any or some of the aforementioned. For example, an action may comprise a resize, a zoom-in, a zoom-out, a cut, a copy, a displacement, a selection, a reflection about an axis, a rotation or any applicable manipulations, modifications or processing that may be applied to a display area or to content. In some embodiments, e.g., if a number of possible actions may be associated with a defined or selected display area, for example, when a defined area comprises elements related to a number of applications or to no specific application, then a menu listing a number of possible actions that can be initiated may be presented.

Figure 6A:
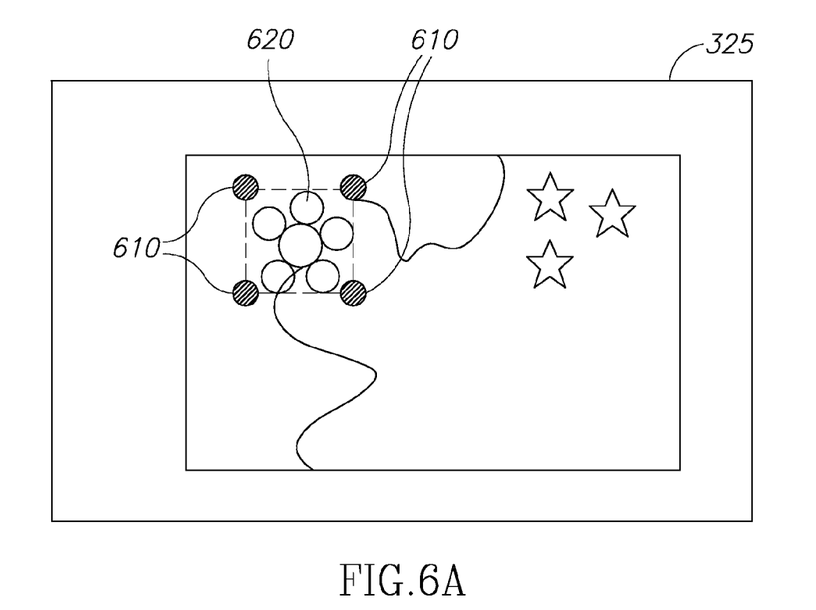
FIGS. 6A, 6B, and 6C show exemplary actions related to a selected display area according to embodiments of the invention.
Figure 6B:
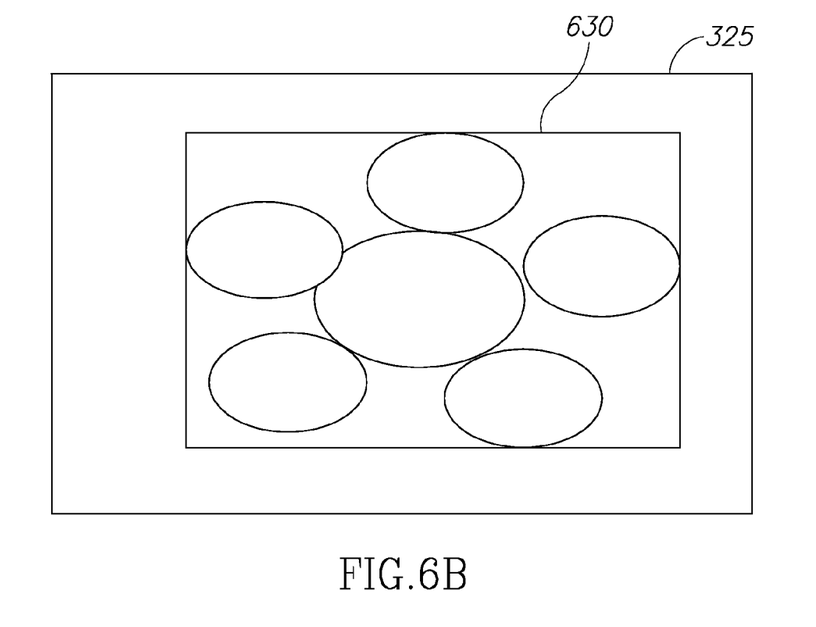

Reference is now made to FIGS. 6A and 6B, which illustrate a display area selected from a display screen and an action performed on such selected display area. As shown by FIG. 6A, user interactions at locations 610 on display 325 may be used to define a display portion or area 620, e.g., as described herein. As shown by 630 in FIG. 6B, a zoom-in action or operation may be performed, e.g., automatically upon selection of display area 620 such that the selected display area 620 is enlarged. It will be understood that any other or additional action or operation, e.g., a cut or copy operation, a rotation or other operations or manipulation may be performed on a defined and/or selected display region or portion such as 620. For example, a display area defined and/or selected as described herein may be zoomed-in so that it is best viewed in accordance with the aspect ratio of the relevant display screen. In addition, the contents of a defined or selected area may be rotated in order to best utilize the relevant display.

Figure 6C:
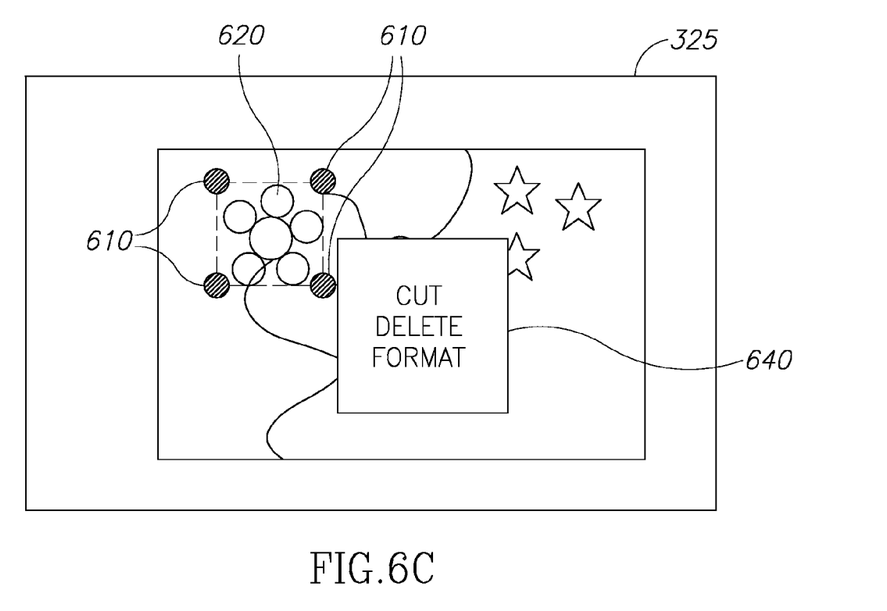

According to embodiments of the invention, an action performed may be or may comprise presenting a selection menu listing actions related to the content included in a selected display or to the display area itself. Reference is now made to FIG. 6C, which illustrates a presentation of a selection menu related to a selected display area according to embodiments of the invention. As shown, a selection menu listing exemplary operations such as cut, delete and format may be presented upon a selection of a display area. Such menu may be presented automatically, e.g., upon selection of a display area as described herein or it may be presented upon detecting a user interaction, e.g., following a selection of display area 620, a tapping on the touch screen 325 may cause embodiments of the invention to present menu 640.

As described herein, an action may be performed or invoked automatically. In other embodiments, an action may be performed based on, or upon detecting, input from a user. For example, in order to invoke menu 640, a user may tap once, twice or any preconfigured number of times anywhere on display 325. For example, following a selection of display area 620, a preconfigured user interaction with touch-screen 325 may be interpreted similarly to a mouse right-click as known in the art. For example, while touching locations 610 to define a display area using four fingers, a user may tap (e.g., with any one or more of the four fingers or with a fifth finger) on display 325 to invoke menu 640. Alternatively, after selecting display area 620 as described herein, a user may perform any predefined user interaction to invoke menu 640. Selecting an action from menu 640 may be done as known in the art, e.g., by touching the desired action in the menu. A preconfigured user interaction or gesture that may invoke a menu or cause other actions to be performed may be any interaction with a touch-screen and may further be associated with any parameters, constraints or aspects. For example, in order to invoke a menu such as menu 640, a user may be required to interact with display 325 in a predefined region, e.g., the lower left corner of display 325. A number of different actions may be performed in relation to a respective number of different interactions. For example, a single tap may cause a zoom-in operation, a double tap may cause a zoom-out operation and a moving of a finger over at least a minimum distance, a predefined curve and/or on along a predefined direction may cause a menu to be presented.

According to embodiments of the invention, an action performed may be based on or related to the content included in or related to a defined display area. For example, by analyzing content in a selected display area, host 22 may select actions to be included in menu 640. For example, if the content included in display area 620 is graphical content then menu 640 may list graphical-related actions such as rotate, zoom-in or color pallet related operations. Alternatively, if content in display area 620 is textual content, then host 22 may select text-related actions such as font size, indentation, spell check or line spacing operations. Accordingly, actions may be content or context sensitive, aware or otherwise content and/or context related. It will be understood that operations listed in a menu as described herein may be performed automatically. For example, if the content in display area 620 is graphical content then a zoom-in operation may be automatically performed upon definition or selection of area 620. Likewise, if the content in area 620 is textual content then a spell check operation may be automatically performed.

Figure 7:
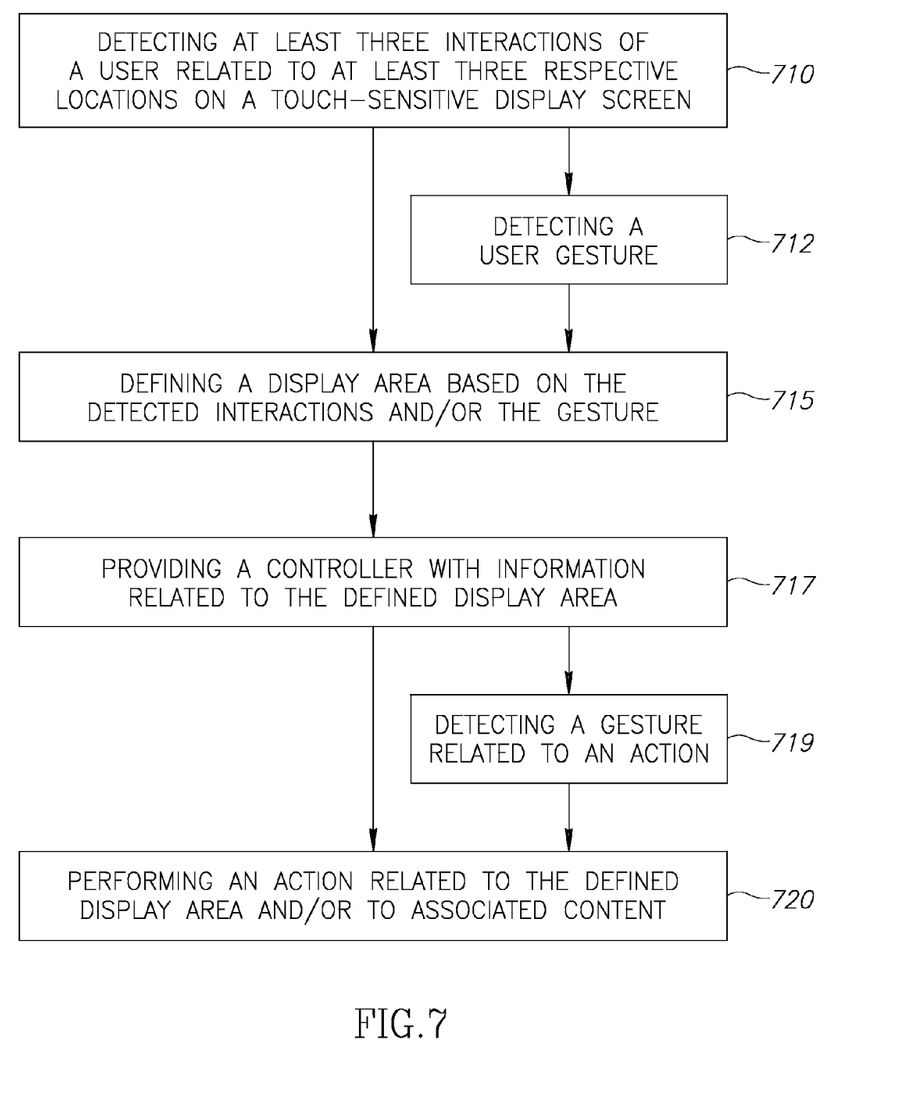
FIG. 7 is an exemplary flowchart according to embodiments of the invention.

Reference is now made to FIG. 7, which shows an exemplary flowchart according to embodiments of the invention. As shown by block 710, the flow may include detecting at least three interactions of a user related to at least three respective locations on a touch-sensitive display screen. For example and as described herein, an interaction may be a touch of a finger or other object, or it may be a near-touch or hover over a touch sensitive display screen. An interaction may be a tap, a double tap, a prolonged touch, or the like. As further described herein, detection of an interaction may be related to, or based on, various time constraints or parameters, a movement related to any of the interactions or any other applicable parameter. For example, detecting a number of interactions may be based on the interactions being detected simultaneously, or within a predefined time period.

As shown by optional block 712, the flow may optionally comprise detecting a user's gesture. For example, a determined or detected gesture may relate to the user's intention to select a display area. In some embodiments, a display area corresponding to locations of user's interactions may only be selected or defined based on a gesture of a user. For example, subsequent to touching four locations on a display screen, a user may further tap anywhere on the display screen to indicate that a display area corresponding to the four locations is to be selected or defined. As indicated by the arrow connecting blocks 710 and 715, a display area may be selected or defined by simply touching a number of locations, namely, in some embodiments, identifying a gesture may not be required in order to select a display area. According to embodiments of the invention, whether a display area is selected by interactions as shown by block 710 or based on an additional gesture may be based on a configuration parameter. For example, selecting a display area by simply touching three or more locations may be faster, hence, suitable for an experienced user. However, a less experienced user may prefer to configure a system to only select an area upon detection of a predefined gesture, e.g., a slide of a finger over the bottom of a display, thus avoiding inadvertent selection of a display area.

As shown by block 715, the flow may include defining or determining a display area based on the detected interactions and/or the gesture. For example, a display area can be determined by digital unit 20, host 22, an operating system or an application executed by the host, based on the locations of the interactions determined on block 710, optionally the gesture detected as shown by block 712, and optionally the data displayed at the area of the interaction locations. For example, and as described herein, a display area corresponding to a triangle may be defined where the triangle is defined by three interactions associated with respective three locations. A display area defined or selected as shown by block 715 may include an object such as a graphical object associated with an application, or it may be an arbitrary area of the associated display as defined by the user interactions, or an area of the display determined based on the user interactions.

As shown by block 717, the flow may include providing a controller with information related to the defined display area. As described herein, any data, parameters or information related to a display screen may be provided to a controller, host or computer, e.g., ASIC 16, digital unit 20 and/or host 22. It will be understood that according to embodiments of the invention, parameters, events, interaction and/or location data, or and/other information related to selection of a display area as described herein may be provided or communicated to any one or more hardware components, firmware, software, or any combination thereof for processing in accordance therewith. Data provided to a computing component or other device as shown by block 717 may comprise raw data indicating detected interaction locations or movements, or it may be or comprise an indication of a determined gesture. As described herein, processing of detected events such as interactions or gestures may depend on design or implementation aspects such as the distribution of functionality over the relevant components or the interface between the relevant components. For example, data related to a selected display area may be passed to digital unit 20, which may handle it or pass it to host 22, which may handle the data or pass to an application.

As shown by block 719, the flow may include detecting a gesture related to an action. For example, an action such as presenting a menu listing a number of possible actions may be performed based on detecting a user gesture, e.g., a double tap on the display screen. As shown by the arrows connecting block 717 with blocks 719 and 720, an action may be automatically performed or it may be based on a user's gesture as shown by block 719. For example, upon selecting a display area comprising a picture, an automatic zoom operation may be performed thus automatically enlarging the selected display area. However, in other cases or configurations, an automatic action may not be desirable. Accordingly, in some embodiments, an action performed with relation to a selected display area may be triggered by a gesture of a user.

As shown by block 720, the flow may include performing an action related to the defined and/or selected display area and/or to associated content. For example and as described herein, an action may comprise providing content associated with the defined display area to a controller and/or any manipulation of the content. For example, an action may be performed by digital unit 20, host 22, an operating system or an application executed by the host. For example, if an application recognized the area as relating to a graphic object, an action may be performed on the object, such as any of the actions that can be performed by the application in relation with the object. According to embodiments of the invention, a default action or operation may be defined or configured. For example, a zoom-in operation or action may be configured as a default action, accordingly, in such case, if an association of a selected area and/or associated content with a particular application may not be determined, a zoom-in on the selected area may be performed.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of interacting with a multi-touch sensitive screen, the method comprising:
    detecting coordinates of at least three interactions of a user, the interactions positioned within a boundary of an object displayed on said screen;
    selecting an area in the object based on said at least three coordinates, wherein the coordinates define size and location of the area; and
    performing an action related to data content associated with said area in the object.

2. The method of claim 1, comprising tracking at least one of said at least three interactions during movement and defining a geometrical parameter of the area based on said movement.

3. The method of claim 1, wherein said at least three interactions are detected substantially simultaneously.

4. The method of claim 1, wherein said at least three interactions are detected within a predefined time interval.

5. The method of claim 4, wherein said predefined interval is measured from the first to occur of said at least three interactions.

6. The method of claim 1, wherein said action is selected based on said data content.

7. The method of claim 1, wherein after defining said area in the object, said action is performed upon detecting at least one interaction of a user with said screen.

8. The method of claim 1, wherein after defining said area in the object, said action is performed upon detecting at least two interactions at substantially the same location on the screen within a predefined time interval.

9. The method of claim 1, wherein said action is performed upon detecting an interaction related to a curve on said screen.

10. The method of claim 1, wherein a shape of said area in the object is selected from the group consisting of: a polygon, a circle, an ellipse, and a substantially closed curve.

11. The method of claim 1, wherein said action is selected from the group consisting of: a resize, a zoom-in, a zoom-out, a cut, a copy, a displacement, a selection, a reflection about an axis, and a rotation.

12. The method of claim 1, wherein said interactions are selected from the group consisting of: a finger touch, a hover and a near finger touch.

13. The method of claim 1, wherein said action comprises presenting a selection menu listing actions related to at least one of the group consisting of: said data content and said area in the object.

14. The method of claim 1, wherein said data content on which said action is performed is one of the group consisting of: graphical data content, textual data content, and multimedia content.

15. The method of claim 1, wherein said a area in the object is defined based on content presented by said screen.

16. A method of interacting with a multi-touch sensitive screen, the method comprising:
    detecting coordinates of at least three interactions of a user the interactions positioned within a boundary of an object displayed on said screen;
    selecting an area in the object based on said at least three coordinates, wherein the coordinates define size and location of the area;
    detecting a user gesture related to said at least three interactions; and
    providing information related to said at least three interactions and said gesture to a computing device.

17. The method of claim 16, comprising performing an action related to said area in the object based on said a user gesture.

18. The method of claim 16, wherein said user gesture is selected from the list consisting of: a tapping on said screen and a movement on said screen.

19. The method of claim 18, wherein said action comprises presenting a selection menu listing actions related to at least one of the group consisting of: said area and content associated with said area.

20. A method of interacting with a multi-touch sensitive screen, the method comprising:
    detecting coordinates of two interactions of a user within a boundary of an object displayed on said screen;
    selecting an area in the object based on the coordinates of the two interactions detected, wherein the coordinates define size and location of the area; and
    performing an action related to data content associated with said area in the object.

21. The method of claim 20, wherein defining said area in the object based on said two locations comprises defining a rectangle defined by a diagonal having said two locations as endpoints.

22. The method of claim 20, wherein defining said area in the object based on said two locations comprises defining a circle defined by a diameter having said two locations as endpoints.

23. A computing system including a multi-touch sensitive screen comprising:
    a multi-touch sensitive screen adapted to display an object and to detect coordinates of at least two interactions of a user within a boundary of the object displayed on the multi-touch sensitive screen;
    a controller that is capable of defining the size and location of an area in the object based on the coordinates of the at least two interactions detected and of performing an action related to data content associated with the area.

24. The system according to claim 23, wherein the controller is capable of displaying a menu on the multi-touch sensitive screen including possible actions to be performed on the data content associated with said area responsive to defining the area.

25. The system of claim 23, wherein the action performed on the data content associated with said area is selected from the group consisting of: a resize, a zoom-in, a zoom-out, a cut, a copy, a displacement, a selection, a reflection about an axis, and a rotation.

26. The system of claim 23, wherein the controller defines the area as a rectangle having a diagonal with end points at coordinates of two of the at least two interactions.

27. The system of claim 23, wherein the controller defines the area as a circle having a diameter with end points at coordinates of two of the at least two interactions.

28. The system of claim 23, wherein the controller is a host computer and wherein the host computer defines size and location of the area based on the coordinates of the two interactions.

29. The system of claim 23, wherein the at least two interactions are selected from the group consisting of: a finger touch, a hover and a near finger touch, a stylus touch, a hover and a near stylus touch.

* * * * *